US006697437B1

(12) United States Patent
Arai et al.

(10) Patent No.: US 6,697,437 B1
(45) Date of Patent: Feb. 24, 2004

(54) RECEIVING APPARATUS

(75) Inventors: Daisuke Arai, Kanagawa (JP);
Masahiro Uno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/506,486

(22) Filed: Feb. 18, 2000

(30) Foreign Application Priority Data

Feb. 22, 1999 (JP) .......................................... 11-043324

(51) Int. Cl.$^7$ .............................................. H04L 27/06

(52) U.S. Cl. ...................................... 375/316; 375/324

(58) Field of Search ................................. 375/316, 324, 375/375, 344, 376

(56) References Cited

U.S. PATENT DOCUMENTS 5,440,587 A * 8/1995 Ishikawa et al. ............ 375/332

* cited by examiner

Primary Examiner—Temesghen Ghebretinsae
(74) Attorney, Agent, or Firm—Jay H. Maioli

(57) ABSTRACT

Apparatus for carrying out correction of a received frequency at a time of receiving a digitally modulated signal includes a phase judging circuit for judging a phase of a received signal symbol in terms of a predetermined number of quantization, a phase difference detecting circuit for detecting a phase difference between phase judged samples judged by the phase judging circuit and an averaging circuit for averaging a detecting output of the phase difference detecting circuit, whereby it is possible to control an output frequency of a frequency synthesizer based on the averaging circuit output.

3 Claims, 7 Drawing Sheets

RECEIVING APPARATUS

BACKGROUND OF THE INVENTION

1. Technical Field

The present invention relates to a receiving apparatus for receiving a digitally modulated signal and particularly to a correcting technology for a received frequency.

2. Description of the Related art

A receiving apparatus for receiving a digitally modulated signal shown in FIG. 6. A digitally modulated signal is received by an antenna 11, and after the received signal is amplified by a high frequency amplifier 12, it is mixed with an output of a frequency synthesizer 14 at a frequency converter 13 and requency-converted to a predetermined intermediate frequency signal. After the converted intermediate frequency signal is amplified by an intermediate frequency amplifier 15 and passed through a band limiting filter 16, it is supplied to an orthogonal detector 17 for orthogonal detection and becomes a base band signal. The orthogonal detection is carried out in synchronization with a frequency of a carrier wave supplied from a frequency synthesizer 18.

The base band signal converted by the orthogonal detector 17 is supplied to a demodulator 19 and the demodulated data is error-corrected by an error-correcting circuit 20 and supplied to a voice decoder 21 to be subjected to a voice decoding process, the decoded voice signal is supplied to a voice output circuit (not shown) at a later stage.

Here, the frequency which is frequency-converted by the frequency converter 13 and the frequency which is detected by the orthogonal detector 17 is determined by the frequency supplied from the frequency convertor 13, but frequency correction needs to be carried out for the frequencies supplied from the frequency synthesizers 14, 18 to synchronize with the frequency of the received signal.

FIG. 2 is a block diagram showing an arrangement for carrying out the conventional frequency correction. The frequency correction is carried out based on a received signal symbol demodulated by the demodulator 19. That is, a frequency offset of the received signal symbol demodulated by the demodulator 19 is detected by a frequency offset detector 31 and the value of the detected frequency offset is averaged by being integrated by a digital integrator 32. The averaged value integrated by the integrator 32 is converted to an analog voltage by a digital/analog convertor 33 and the converted voltage is supplied to a control voltage input of a voltage controlled oscillator 34 to control the output frequency of the voltage controlled oscillator 34. An output of the voltage controlled oscillator 34 is supplied to the frequency synthesizers 14, 18 to control their output frequencies.

By the control in this circuit, the correction of the received frequency can be carried out. First of all, in regard to the digital modulated-signal to be received, if a digital information signal of an in-phase component is assumed to be I(t) while a digital information signal of an orthogonal component is assumed to be Q(t), a signal X(t) of the information component is defined by a complex number such as X(t)= I(t)+jQ(t). The digitally modulated signal can be expressed in the following.

$$s(t)=Re(x(t) \cdot e^{j2\pi fct})$$ [Equation 1]

Here, fc denotes a carrier wave frequency and the carrier wave is expressed by a complex sinusoidal wave c(t) $=e^{j2\pi fct}$.

The digitally modulated received signal is, by being subjected to an orthogonal demodulation on the receiving apparatus side, extracted as a signal of the information component as a base band signal. The orthogonal demodulation will be explained hereinafter. The digitally modulated received signal is demodulated in the following way by being multiplied by a received carrier wave with a reverse phase rotation relative to the carrier wave.

$$F(s(t) \cdot e^{\pi f - 2\pi fct}) = \frac{1}{2}F[(x(t) \cdot e^{j2\pi fct} + \\ x*(t) \cdot e^{-j2\pi fct}) \cdot e^{-j2\pi fct}]$$
$$= \frac{1}{2}F[x(t) + x*(t) \cdot e^{-j2\pi fct}]$$
$$= \frac{1}{2}(X(f) + x*(-f - 2fc))$$

[Equation 2]

Here, X(f) denotes a frequency of x(t) and x*(t) and X*(f) express complex conjugates of x(t) and X(f). By taking out only a low-band signal from the demodulated received signal by a low-pass filter, the base band signal can be obtained.

When there exists a frequency offset f between the carrier frequency used for the digital modulation and the frequency of the complex sinusoidal wave used for the orthogonal demodulation, the reception signal converted by the orthogonal demodulation is expressed in the following equation and the base band signal obtained after the low-band signal is extracted by the low-pass filter is, as shown in FIG. 3, observed as time phase rotation of an angular velocity ω=2f on an IQ plane.

$$F(s(t) \cdot e^{-j2\pi(fc+\Delta f)t}) = \frac{1}{2}F[(x(t) \cdot e^{j2\pi fct} + x*(t) \cdot \\ e^{-j2\pi(fc+\Delta f)t}) \cdot e^{-j2\pi(fc+\Delta f)t}]$$
$$= \frac{1}{2}F[(x(t) \cdot e^{-j2\pi \Delta ft} + x* \\ (t)e^{-j2\pi 2(fc+\Delta f)t})$$
$$= \frac{1}{2}(X(f-\Delta f)X*(-f-2(f_c+\Delta f)))$$

[Equation 3]

Since this causes a serious influence on a code judgement error of the received signal, it is necessary to measure transmission and received frequency offsets as well as correcting a received carrier wave frequency on the receiving apparatus side.

Next, a process for estimating the frequency offset will be explained with reference to the system shown in FIG. 2. When a received signal symbol $r_t$ outputted by the demodulator 19 of FIG. 1 and a transmission signal symbol corresponding to a previously demodulated received signal symbol $r_{t-n}$ are identical, by carrying out an arctan operation to a value obtained by complex conjugate multiplication between $r_t$ and $r_{t-n}$, a phase rotation angle Δθ can be detected. By obtaining the phase rotation angle Δθ which rotates on the IQ plane at some constant interval Δt, the frequency offset Δf can be obtained by the following.

$$\Delta f = \frac{\Delta \theta}{2\pi \cdot \Delta t}$$

In the conventional process for estimating a frequency offset, the following problems arise. When a phase rotation angle between symbols is detected, an arctan operation is necessary to obtain a value which is obtained by complex conjugate multiplication of the two symbols, but since the amount of calculation of the arctan operation is comparatively large, when a real time process is needed, it can happen that the arctan operation process does not end within a required time. In order to avoid this, the following approximation has been carried out. Here, amplitude $r_{tk}$ is denoted as $A_t$, a phase angle as $\theta_t$, an in-phase signal as it and an orthogonal signal as $q_t$.

$$r''_t r^*_{t-n} = A_t \cdot e^{j\theta^t} \cdot A_{t-n} \cdot e^{-j\theta^{t-n}} \qquad \text{[Equation 5]}$$
$$= A_t \cdot A_{t-n} \cdot e^{j(\theta^t - \theta^{t-n})}$$
$$= A_t \cdot A_{t-n} \cdot e^{j\Delta\theta}$$
$$= A_t \cdot A_{t-n} \cdot (\cos\Delta\theta + j\sin\Delta\theta)$$
$$= (i_t + jq_t) \cdot (i_{t-n} - jq_{t-n})$$
$$= (i_t \cdot i_{t-n} + q_t \cdot q_{t-n}) + j(q_t \cdot i_{t-n} - i_t \cdot q_{t-n})$$

By utilizing the approximation that $\Delta\theta = \sin \Delta\theta$ is true when $\Delta\theta$ is near to zero, the phase rotation angle $\Delta\theta$ can be expressed in the following formula.

$$\Delta\theta = q_t i_{t-n} - i_t q_{t-n} \qquad \text{[Equation 6]}$$

When this approximation is used, however, the phase rotation angle of the frequency offset which can be detected is limited to within a range of $\pm\pi/2$. When the phase rotation angle exceeds the range of $\pm\pi/2$, the frequency offset is erroneously detected. Also, according to the equation 5, since a presumed value of the phase rotation angle changes depending on a strength of the received signal, there is a change in a presumed value of the frequency offset, thereby incurring variations in converging time and correction errors. Also, since the interval between the received signal symbols used for detecting the conventional frequency offset is constant, there have been problems that when the interval between the symbols is narrow, although a frequency pulling-in range becomes wide, the frequency correction error becomes large after the pulling-in, while when the interval between the symbols is wide, although the frequency correction error becomes small after the pulling-in, the frequency pulling-in range becomes narrow.

SUMMARY OF THE INVENTION

An object of the present invention is to make it possible to favorably carry out correction of the received frequency when receiving a digitally modulated signal.

The present invention comprises phase judging means for judging a phase of a received signal symbol by the predetermined number of quantization, phase difference detecting means for detecting a phase difference between phase-judged samples judged by the phase judging means and averaging means for averaging a detecting output of the phase difference detecting means, to thereby control an output frequency of a frequency synthesizer based on an output of the averaging means.

According to such an arrangement, the phase judging means digitally judges the phase by the predetermined number of quantization, and a difference between the judged phase value and a phase value immediately before is detected by the phase difference detecting means and the detected phase difference is predeterminately averaged by the averaging means and the output of the frequency synthesizer is controlled based on the averaged frequency error and a frequency subjected to a received process is corrected.

DESCRIPTION OF THE PREFERRED EMBODIMENTS

In the following one embodiment of the present invention will be explained with reference to FIG. 4 to FIG. 8. In FIG. 4 to FIG. 8, by attaching the same numerals to corresponding portions in diagrams of FIG. 1 and figures thereafter which are explained as the conventional example, detailed explanations thereof are omitted.

Figure 1:
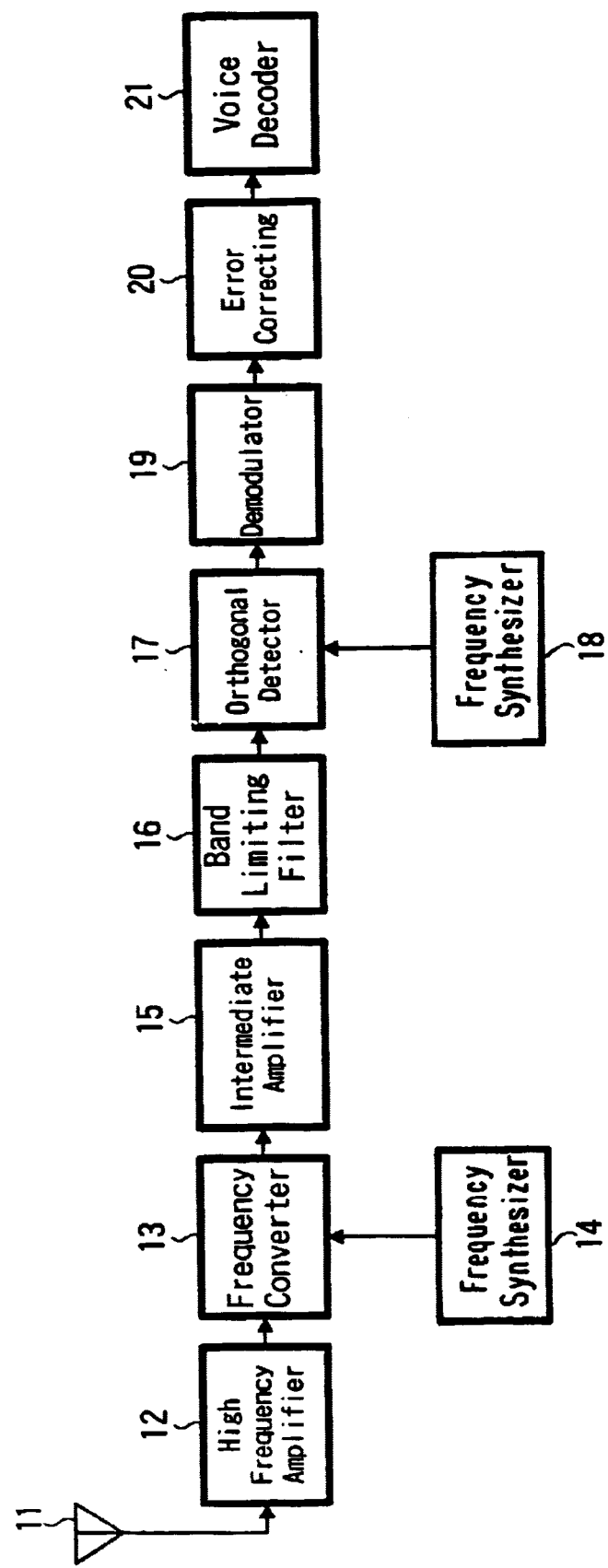
FIG. 1 is a block diagram showing an arrangement of a known digital receiving apparatus.
Figure 4:
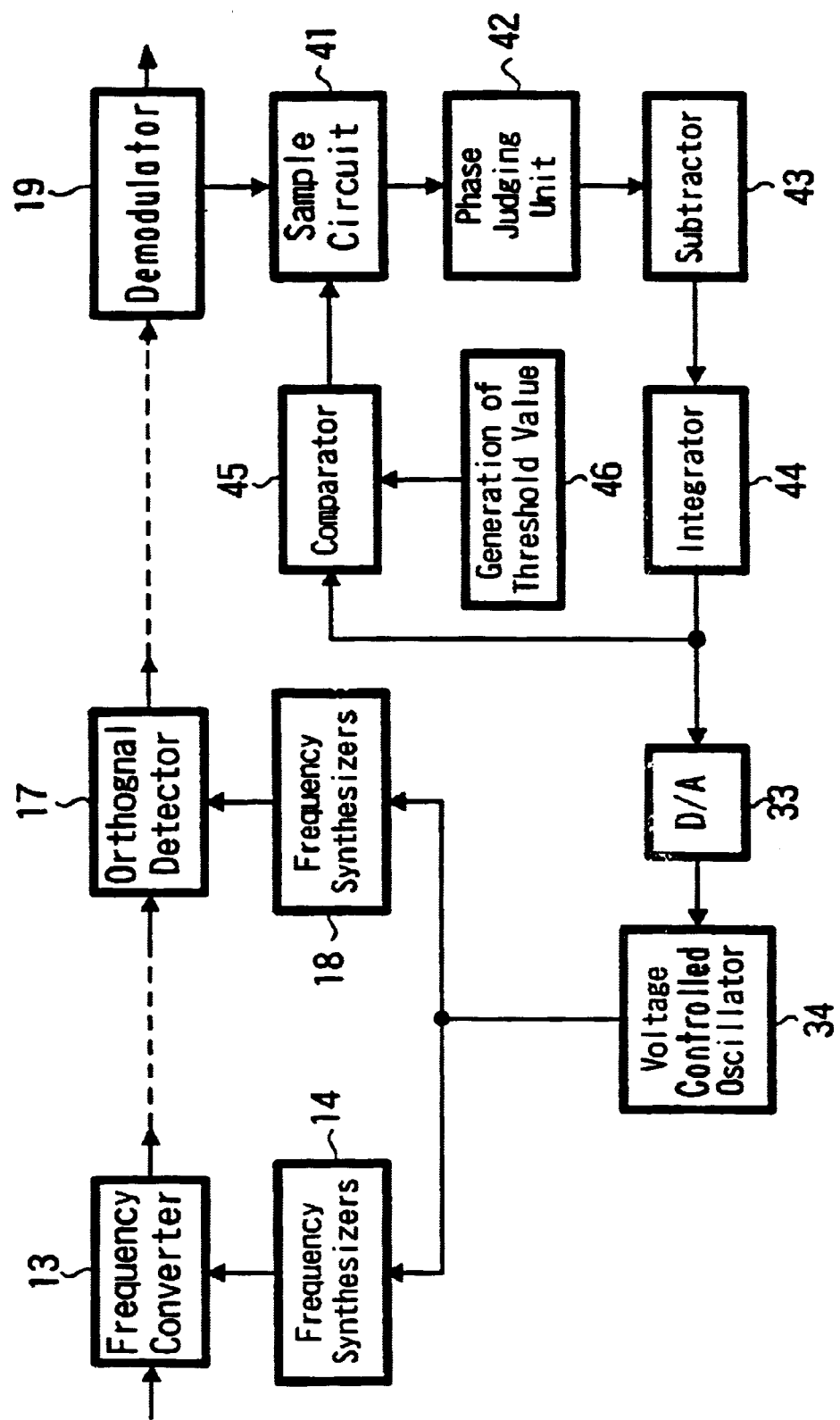
FIG. 4 is a block diagram of a system for correcting for phase shifts in a digital receiver according to an embodiment of the present invention.

In the present embodiment, there is provided a frequency correcting circuit which is applied to a digital signal receiving apparatus which is shown in FIG. 1 as the conventional example and the arrangement thereof is shown in FIG. 4. That is, a received signal symbol demodulated by a demodulator 19 is sampled by a sample circuit 41 and the sampled received signal symbol is supplied to a phase judging unit 42. In this case, sample timing by the sample circuit 41 is set based on a result of comparison by a comparator 45. The setting process of the sample timing will be explained later.

Figure 2:
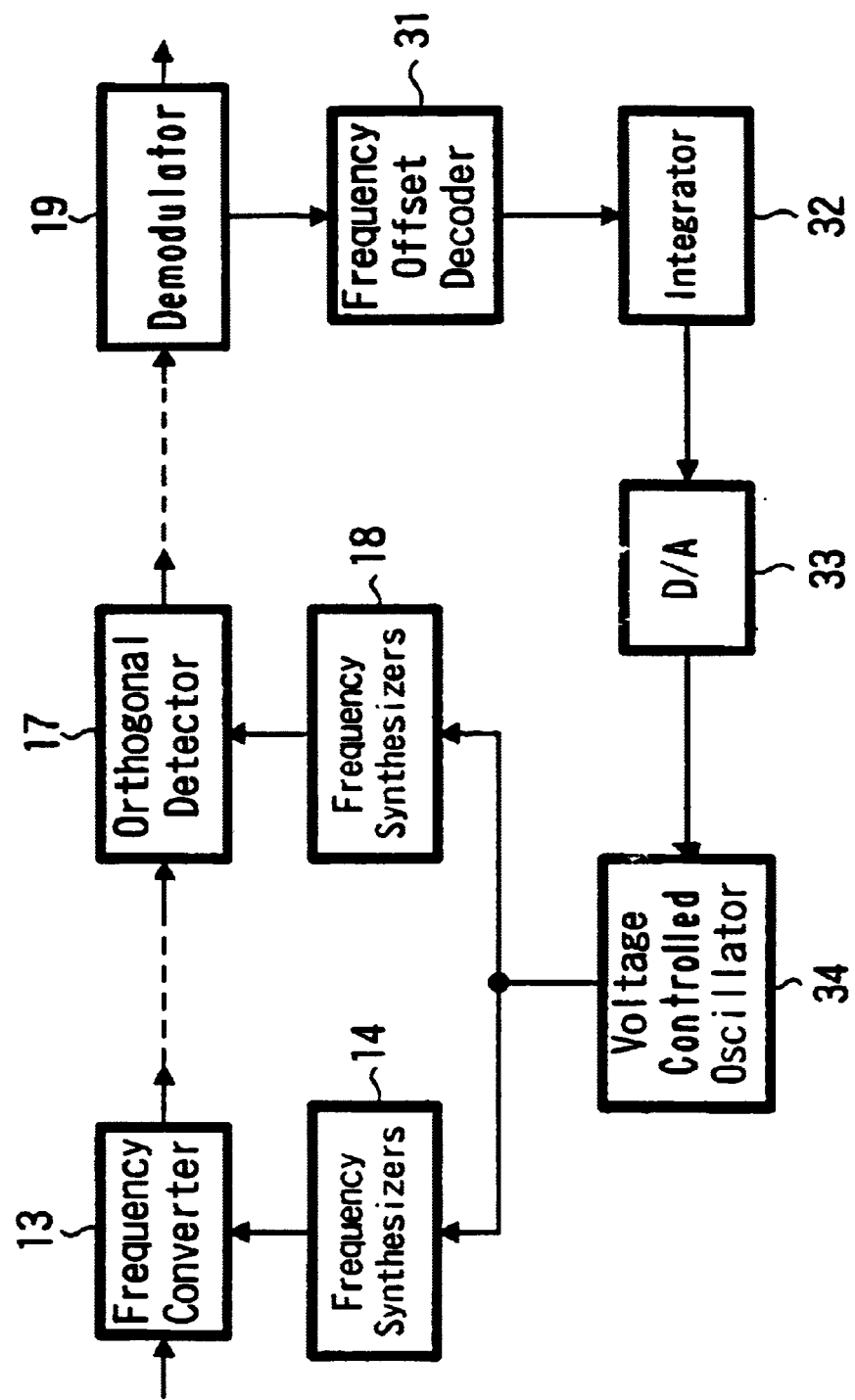
FIG. 2. is a block diagram of a known arrangement for correcting for a frequency offset in the receiver of FIG. 1.
Figure 3:
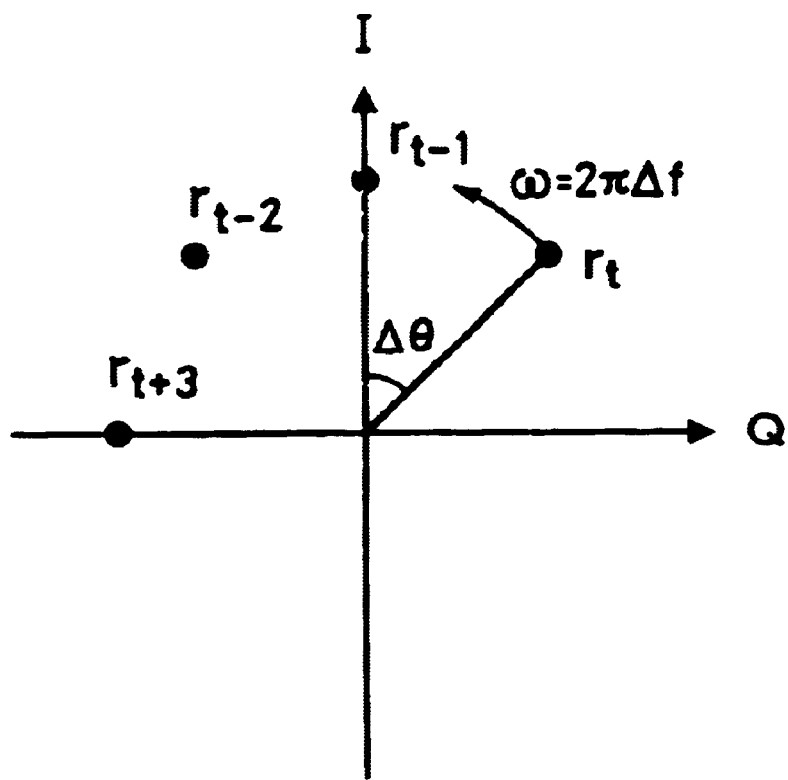
FIG. 3. is an explanatory diagram showing a phase rotation in a signal received by the receiver of FIG. 1.

In the phase judging unit 42, the received signal symbol is judged by the predetermined number of quantization. Here, the judgement is carried out in terms of eight phases as the number of quantization. That is, as shown in FIG. 2, a range of $2\pi$ on a IQ plane with I as a in-phase component and Q as an orthogonal component is divided into eight phases at equal spaces (that is, quantization step is $\pi/4$) and 3 bits data, for example, "000", "001", "010", "010", "100", "101", "110" and "111" are allocated to each of the ranges.

Figure 5:
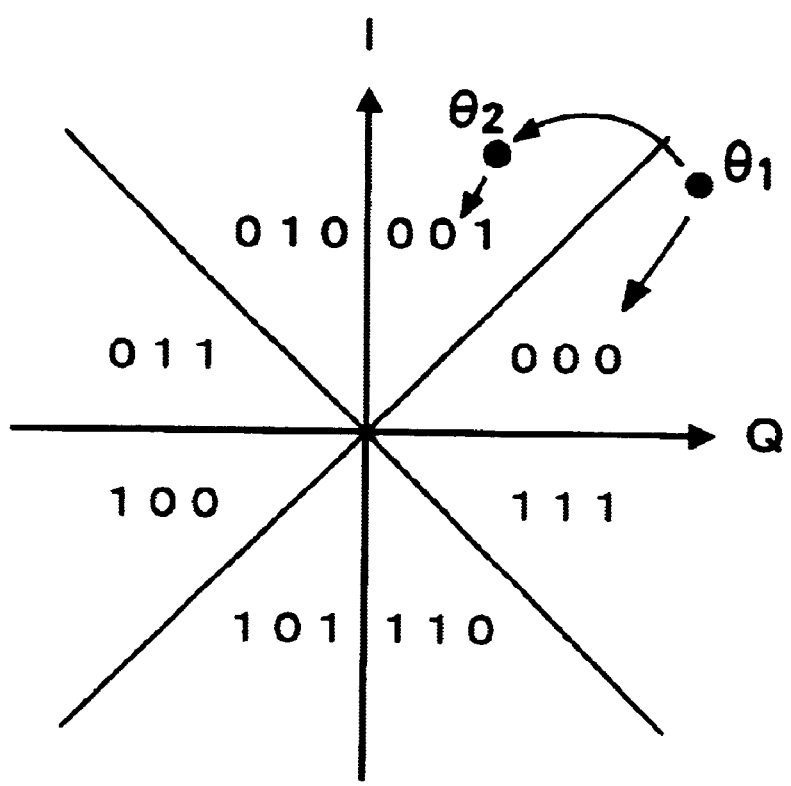
FIG. 5 is an explanatory diagram showing a concept of eight phase judgement for eight different phases according to an embodiment of the present invention.

For example, as shown in FIG. 5, when a symbol phase of some sample timing is θ1, let data be "000" at the phase judging unit 42, and when a symbol phase of the next sample timing is θ2, let data be "001" at the phase judging unit 42.

Then, data on the phase judged value judged by the phase judging unit 42 is supplied to a subtractor 43 and a difference $\Delta f$ from a judged value of sample data immediately before is operated. For example, when data on the above-mentioned two sample timings are "000" and "001", "001" or a difference between both the data is operated. Data on the difference is supplied to a digital integrator 44 for integration and an average value $E[\Delta\theta]$ of phase differences for a predetermined period of time is calculated. The average value $E[\Delta\theta]$ becomes a value proportional to a frequency offset $\Delta f$.

The data integrated by the digital integrator 44 is supplied to a digital/analog converter 33 to be converted to an analog voltage signal and the converted analog voltage signal is supplied to a controlling voltage input of a voltage controlled oscillator 34 to control an output frequency of the voltage controlled oscillator 34. An output of the voltage control oscillator 34 is supplied to the frequency synthesizers 14, 18 to control output frequencies of both the frequency synthesizers 14, 18 and the frequency output offset $\Delta f$ is corrected.

Also, the integrated data of the digital integrator 44 is supplied to the comparator 45 to be compared with a threshold value supplied from a threshold value generator 46 and, based on a result of the comparison, the sample interval in the sample circuit 41 is varied. To be concrete, it is arranged such that in an initial state when reception of a predetermined frequency is started, a comparatively narrow sample interval is set and as the value of frequency offset $\Delta f$ becomes smaller, it is varied to a comparatively wide sample interval. Its concrete process will be described later.

Next, a process of the phase judging unit 42 for carrying out a phase judgement will be explained in detail. In a case when the phase judgement of eight phases is carried out by the phase judging unit 42, a phase judging sample $r_t$ relative to a received signal symbol $x_t=(i_t, q_t)$ can be shown by an algorithm of the following formula. However, a symbol that "+" is encircled by "o" shows here carrying out of an exclusive logical add operation (a so-called $E_x$ OR operation) at every bit and figures are expressed in terms of hexadecimal notation.

$$r_t=0;$$
$$if(i_t<0)r_t=r_t\oplus 0x03;$$
$$if(q_t<0)r_t=r_t\oplus 0x0f;$$
$$if(|i_t|<|q_t|)r_t=r_t\oplus 0x01;$$ [Equation 7]

Figure 6:
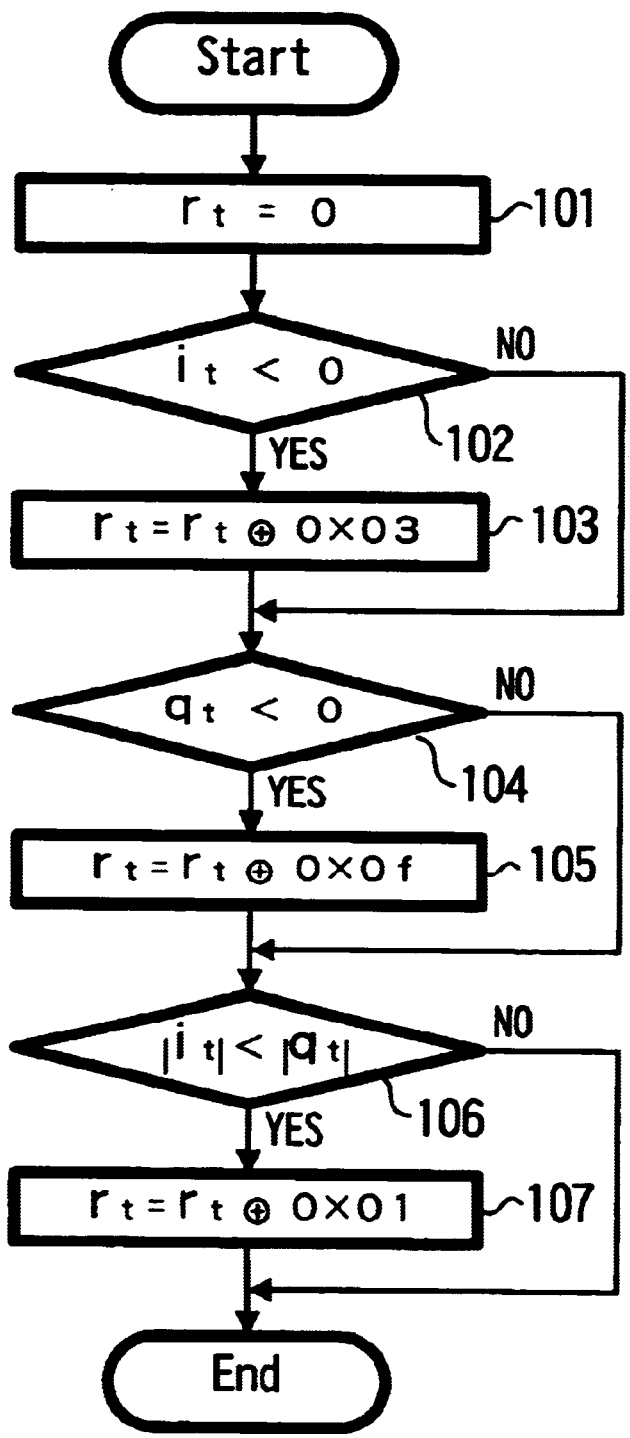
FIG. 6 is a flowchart showing a process of varying a sample interval according to an embodiment of the present invention.

If the algorithm of the formula is to be shown in a flowchart, it should be what is shown in FIG. 6. That is, first of all, let a phase judging sample be $r_t=0$ (step 101) and whether or not a value of $i_t$ is less than 0 is judged (step 102). Here, when it is less than 0, a value obtained by carrying out an $E_x$ OR operation between the value of $i_t$ and a predetermined hexadecimal notation "0x03" is a value of $i_t$ (step 103). Next, it is judged whether or not a value of $q_t$ is less than 0 (step 104). Here, when the $q_t$ is less than 0, a value obtained by carrying out an $E_x$ OR operation between the value of $q_t$ and a predetermined hexadecimal notation "0x0f" is a value of $q_t$ (step 105). Further, a comparison is made between an absolute value of $i_t$ and that of $q_t$ (step 106) and when the absolute value of $q_t$ is larger, as a value of the phase judging sample $r_t$, a value obtained by carrying out an $E_x$ OR operation between the value of rt and a predetermined hexadecimal notation "0x01" is the value of the phase judging sample $r_t$ (step 107).

By carrying out the phase judgement in this manner, it is possible for the phase judging unit 42 to precisely quantize the phase of the received signal symbol to eight values.

Figure 7:
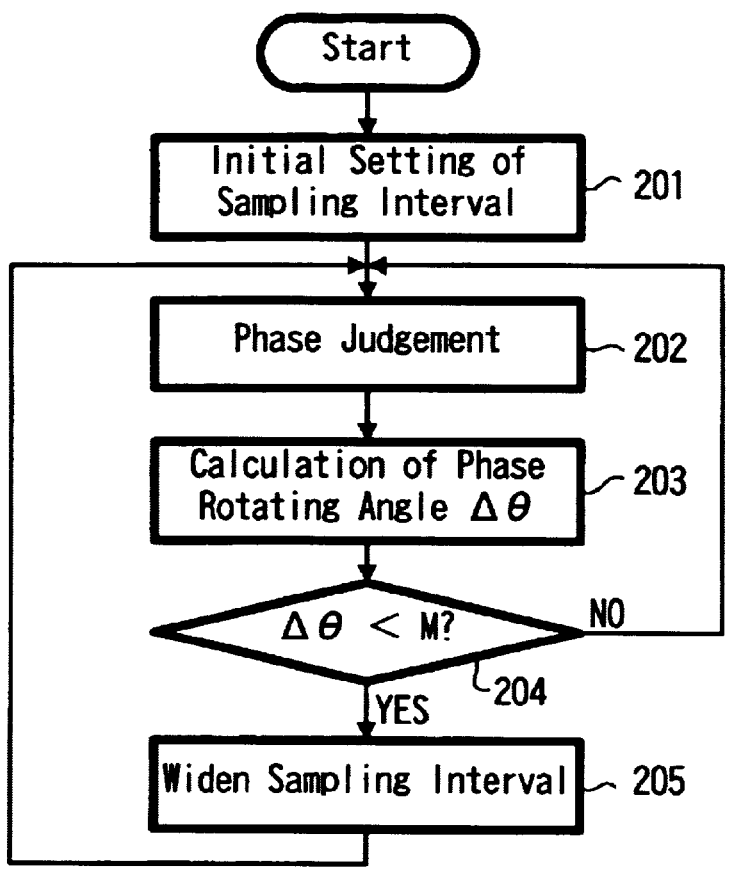
FIG. 7 is a flowchart showing a process of varying a sampling interval according to an embodiment of the present invention.

Next, a process for varying the sample timing will be explained with reference to a flowchart in FIG. 7. First of all, when reception of a signal by a predetermined channel is started, the sample circuit 41 sets an initial value previously prepared as a sample interval (step 201). The initial value is set as a comparatively narrow sample interval. In this state, a phase judging process is carried out by the phase judging unit 42 (step 202) and a phase rotation angle $\Delta\theta$ is calculated (step 203) and in a comparator 45, it is judged whether or not the value of the phase rotation angle $\Delta\theta$ judged from an output of an integrator 44 is a less value than a threshold value M set by a threshold generator 46 (step 204). Here, when it is judged that the value is not less than the threshold value M, the process returns to the step 202 and carries out the phase judging process of the next sample timing.

Then, in a case when it is judged that the value of the phase rotation angle $\Delta\theta$ is less than the threshold value M, it can be judged that the value of the frequency offset $\Delta f$ has become smaller, and the sample interval in the sample circuit 41 is widened (step 205), then the process returning to step 202.

According to the receiving apparatus of the embodiment explained so far, it is possible to precisely judge the frequency offset without respect to the received signal level as well as to carry out an accurate frequency correction. That is, by carrying out a judgement based on a small number of quantization (here, eight phases) at the phase judging unit 42, it is possible to precisely judge the frequency offset, to simplify a circuit scale of the phase judging unit and the amount of operation processing and further, to carry out a phase judgement of a high precision without respect to the received signal level.

Also, according to the present embodiment, since a phase difference detecting output of the subtractor 43 as a phase difference detecting means is averaged by the integrator 44, it is possible to reduce any error of the phase rotation angle due to a noise as well as to improve a frequency detecting precision. This is because of a principle that it is possible to improve a precision by increasing the number of average samples although the number of quantization is sparse. Also, in a case of the embodiment where the quantization by eight phases is carried out by the phase judging unit 42, it becomes possible for the subtractor 43 to detect a frequency offset in a wide range of about $-3\pi/4\sim+3\pi/4$, and a range capable of detecting the frequency offset becomes wider than the conventional one. That is, compared with a case of the example shown in FIG. 2 as the conventional one wherein a frequency offset only in a range of about $-\pi/2\sim+\pi/2$ can be detected, detection of frequency offset in a wider range becomes possible, thereby making it possible to cope with a case of a larger frequency offset.

Also, by varying the sample interval in response to a frequency offset then, it becomes possible to make a pulling-in range of the frequency offset as well as to minimize a frequency correction error after the pulling-in. Meanwhile, in the example shown in the flowchart in FIG. 7, the sample interval is made to vary in two steps of an initial state and a state when the frequency offset becomes smaller, but the sample interval may be varied to a number of smaller steps. Also, in a case when the frequency offset becomes larger due to an unknown factor in the midst of receiving a signal, the sample interval may be returned to a narrow state.

Figure 8:
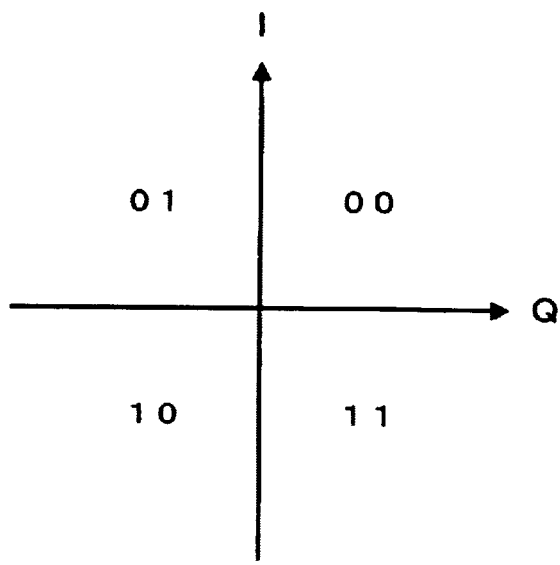
FIG. 8 is an explanatory diagram showing a concept of phase judgement for four phases according to the present invention.

Meanwhile, in the above-mentioned embodiment, although the number of quantization at the time of carrying out the phase judgement by the phase judging unit is eight phases, another number of quantization may be used. For example, the number of quantization by the phase judging unit may be four phases. That is, as shown in FIG. 8, by dividing a range of $2\pi$ on an IQ plane to four phases at an equal space; I being an in-phase component of the received signal symbol and Q being an orthogonal component (that is, a quantum step is $\pi/2$), for example, 2 bit data "00", "0.1.", "10" and "11" are allocated to each of the ranges to carry out the phase judgement. A phase judging sample rt relative to a received signal symbol $X_t=(i_t, q_t)$ in this case can be shown by algorithm of the following formula. However, the symbol [|] here is a logically add operation at every bit (a so-called OR operation) and a symbol that "+" is encircled by "o" here shows carrying out of an exclusive logical add operation (a so-called $E_x$ OR operation) at every bit and figures are expressed in terms of hexadecimal notation.

$r_t = 0$ ;

$if(r_t<0)r_t=r_t|0x01;$ $in(q_t<0)r_t=r_t \oplus 0x03;$ [Equation 8]

In a case when the phase judgement is carried out by quantization of the four phases, it becomes possible to detect a frequency offset in ranges of about $-\pi/2\sim+\pi/2$. The detecting ranges of the frequency offset is similar to the detecting ranges of the arrangement shown in FIG. 2 as the conventional example, but since the detecting precision comes to not depend on a received signal level, the detecting precision becomes higher than the conventional one and at the same time, by carrying out the control of the sample interval, there is provided an effect capable of minimizing a frequency error after the pulling-in.

Meanwhile, the example explained up to now is applied as the one for carrying out the control of the sample interval, but there may be an arrangement in which the comparator 45 and the threshold generator 45 are not provided by making the sample interval always constant at the sample circuit 41.

According to the present invention, by digitally judging the phase in terms of a predetermined number of quantization by the phase judging means, detecting the difference between the judged phase value and the phase value immediately before, and carrying out the frequency correction based on an average value of the phase difference, the favorable detection of the frequency offset without respect to the received signal level can be carried out as well as the favorable frequency correction can be carried out based on the detected frequency offset value.

According to the present invention, by providing sampling interval setting means for varying the sampling interval to be phase-judged by the phase judging means based on an output of the averaging means, it is possible to widen the pulling-in range of the means offset as well as to minimize the correction error at the time of converging.

According to the present invention, by making the number of quantization of the phase judged by the phase judging means eight phases, it is possible to detect the frequency offset in the ranges of $-3\pi/4\sim+3\pi/4$ of the phase rotation between the phase judged samplings is about as well as to carry out the favorable frequency correction.

According to the present invention, by making the number of quantization of the phase to be judged by the phase judging means four phases, it is possible to detect the frequency offset in the ranges of $-\pi/2\sim+\pi/2$ of the phase rotation between the phase judged samplings is about as well as to carry out the favorable frequency correction.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A receiving apparatus comprising:
   a frequency synthesizer having a variably set output frequency,
   frequency converting means for converting a frequency of a received signal based on the output frequency of said frequency synthesizer,
   phase judging means for judging, based on a predetermined quantization number, a phase of a received signal symbol outputted by said frequency converting means and outputting phase judged samples,
   phase difference detecting means for detecting a phase difference between successive phase judged samples output by said phase judging means and producing respective detecting outputs,
   averaging means for averaging the detecting outputs from said phase difference detecting means, and
   control means for controlling the output frequency of said frequency synthesizer based on an output of said averaging means.

2. The receiving apparatus as claimed in claim 1, further comprising
   sampling interval setting means for varying a sampling interval, whose phase is judged by said phase judging means, based on the output of said averaging means.

3. The receiving apparatus as claimed in claim 1, wherein the quantization number of the phase judged by said phase judging means is four phases.

* * * * *